(No Model.)
J. H. DANCER.
HORSE TOOTH CUTTER.
No. 298,556. Patented May 13, 1884.
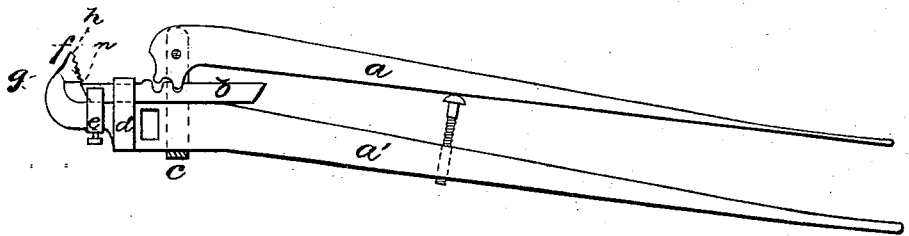
Attest:
F. T. Campbell.
Chas. P. Herr.
Inventor:
John H. Dancer,
by Drake & Co.
Attys.

UNITED STATES PATENT OFFICE.

JOHN H. DANCER, OF ORANGE, NEW JERSEY.

HORSE-TOOTH CUTTER.

SPECIFICATION forming part of Letters Patent No. 298,556, dated May 13, 1884.

Application filed December 5, 1883. (No model.)

*To all whom it may concern:*

Be it known that I, JOHN H. DANCER, a citizen of the United States, residing at Orange, in the county of Essex and State of New Jersey, have invented certain new and useful Improvements in Horse-Tooth Cutters; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

The object of this invention is to cut the teeth of animals with greater precision and facility than by the means heretofore employed.

It consists in the constructions, arrangements, and combinations of parts, substantially as will be hereinafter set forth, and finally embodied in the claims.

Referring to the accompanying drawing, which is a side elevation of my improved device, $a$ $a'$ are sections pivoted together and carrying a sliding cutter, $b$, therebetween, the former of said sections being a lever fulcrumed between upwardly-projecting ears of the strap $c$, and the latter section, $a'$, being turned, as shown, to pass upward behind the tooth of the animal, to form a rest, $f$, therefor, the tooth lying against said rest when the cutter, forced forward by the lever $a$ or other suitable means, engages with the tooth from the front. The cutter, passing beneath the rest, as shown, co-operates with the lower edge, $n$, thereof to sever the tooth. The outer surface of the rest is concaved at $g$ to receive the bar behind the horse's tooth, and pointed or brought to a rather sharp angle, as at $h$, to allow the rest to pass between said bar and the base of the tooth. Upon the section $a'$, near its cutting extremity, is arranged the adjustable gage $e$, which, by being raised or lowered by the adjusting-screw $m$, regulates the amount of matter to be cut from the tooth. A loop, $d$, holds the cutter in place upon the section $a'$.

The cutter is preferably provided with cutting-edges at both of its extremities, as the silicious nature of the tooth soon dulls the said edge and renders the same inoperative; but by having both extremities sharpened the need of a new cutter or of resharpening the old one is postponed.

The cutter, when operated by the mechanism shown, is recessed to receive the dentate lever; but the cutter may be operated by other means—as, for example, a screw—in which case the recess would be done away with.

Having thus described my invention, what I claim as new, and desire to secure by Letters Patent, is—

1. In a tooth-cutter, the section $a'$, having the turned extremity provided with the co-operating edge $n$, the sliding cutter $b$, the gage $e$, and mechanism to operate the cutter, all combined substantially as shown and described.

2. In combination, in a tooth-cutter, the section $a$, having the angular rest $f$, provided with the concavity $g$, to receive the bar back of the animal's tooth, the cutter, and means to operate the same, substantially as shown.

3. In combination with the section $a'$, having the rest $f$, a cutter having both extremities sharpened, and mechanism to operate the same.

In testimony that I claim the foregoing I have hereunto set my hand this 21st day of November, 1883.

JOHN H. DANCER.

Witnesses:
 CHARLES H. PELL,
 F. F. CAMPBELL.